(12) United States Patent
Bar-Yam

(10) Patent No.: US 8,296,242 B1
(45) Date of Patent: Oct. 23, 2012

(54) METHOD AND APPARATUS FOR COORDINATING AND TRACKING DELIVERY OF A BENEFIT

(76) Inventor: Yaneer Bar-Yam, Newton, MA (US)

(*) Notice: Subject to any disclaimer, the term of this patent is extended or adjusted under 35 U.S.C. 154(b) by 203 days.

(21) Appl. No.: 12/788,900

(22) Filed: May 27, 2010

(51) Int. Cl.
G06Q 20/00 (2006.01)
G06F 21/00 (2006.01)
G06K 19/06 (2006.01)

(52) U.S. Cl. ............... 705/65; 705/41; 705/59; 235/492
(58) Field of Classification Search ............... 705/65
See application file for complete search history.

(56) References Cited

U.S. PATENT DOCUMENTS

| | | | |
|---|---|---|---|
| 2003/0173407 A1* | 9/2003 | Raadsen | 235/492 |
| 2004/0083173 A1* | 4/2004 | Reddihough et al. | 705/41 |
| 2007/0038525 A1* | 2/2007 | Waldvogel et al. | 705/26 |
| 2008/0195499 A1* | 8/2008 | Meredith et al. | 705/26 |

* cited by examiner

Primary Examiner — Charles C Agwumezie
(74) Attorney, Agent, or Firm — Chapin IP Law, LLC

(57) ABSTRACT

A method for validating and securing transactions involving multiple agents separated by physical space or scheduling constraints is presented. In the invention messages (informational tokens) are communicated at key junctures during a transaction (a transfer of goods or provision of services) to provide confirmation of the transaction to parties that are not present during the transaction. The transfer of informational tokens may occur by attachment to products or service related packages, through telephone, Internet or other inter-party communications channels.

27 Claims, 7 Drawing Sheets

Part I: Prior to transaction

Step 1: Payer arranges for or confirms that benefit can be delivered by providers to recipient, including transmission of benefit associated informational token 4 to the provider.

Step 2: Payer transmits message with informational token 1 to receiver, identifying the payer and the benefit payer is willing to pay for the receiver. Uniqueness of the informational token may serve to identify the recipient for the transaction even without an identifier of the receiver.

Part II: Transaction

Step 3: Receiver goes to a Provider and transmits informational tokens 1 and 2 to the provider.

Step 4: Provider gives benefit to receiver.

Part III: Payment

Step 5: Provider transmits informational tokens 1,3,4 to the payer

Step 6: Payer pays the provider

*Figure 3*

METHOD AND APPARATUS FOR COORDINATING AND TRACKING DELIVERY OF A BENEFIT

BACKGROUND

Computer and communication technologies have provided many opportunities for developing transaction methods such as credit cards, debit cards, and electronic fund transfers. Many of these involve encryption of messages which authorize, acknowledge and/or allow the transfer of funds upon validation by the owner of the funds. This has provided new methods of conducting conventional transactions consisting of a reciprocal exchange of currency for goods/services. These methods allow a third party to engage in the currency exchange aspect of the transaction. None of these however addresses the validation of the goods/services for which the currency is exchanged for a party not present at the transaction. This creates limitations on the flexibility of the types of transactions that can be performed and the reliability of transactions that might be performed.

In another well established approach in which three parties are involved in a transaction, a special currency (i.e. food stamps) is given directly by one party (a government agency) to the another party (a citizen), this special currency is used to receive a benefit (food) from a third party provider (a supermarket), and then is redeemed for legal tender. While this approach enables validation of the benefit under conditions of a reliable provider, it does not validate the recipient, enabling abuse. Newer systems involving payment cards with personal identification numbers only partly address this and other limitations.

There are other ways in which multiple parties can engage in transactions in which the parties are separated by space, or by scheduling constraints and communication between the parties are limited. Examples of such transactions would include: 1) charity or philanthropic organization A providing funds to service organization B which in turn provides services to an individual or a population C, and 2) party A providing tokens to party B that can be redeemed only for a predetermined set of goods or services at a predetermined time, such as gift cards.

SUMMARY

Conventional mechanisms such as those explained above suffer from a variety of deficiencies. One such deficiency is that they do not compensate for the lack of transparency when the transaction takes place over time and without the direct participation of all parties at every stage. It is in the interest of the organization/party disbursing funds to verify the transaction proceeds in a proper fashion. Today such verification typically takes the form (1) "self-policing" by the provider, which is subject to abuse, (2) sampling of performance used to identify transgressions, e.g. audits, or (3) organizational infrastructures to provide oversight. All of these methods can be costly, labor-intensive, and unreliable.

Embodiments of the invention significantly overcome such deficiencies and provide mechanisms and techniques for coordinating and tracking delivery of a benefit, which include methods for monitoring transactions comprised of communications that transfer informational tokens between the involved parties. These parties may include one or more payers, providers, exchangers or recipients of benefits. The methods enable an enhanced degree of verification or validation of the transaction and of the involved parties.

In a particular embodiment of a method for coordinating and tracking the delivery of a benefit, the method includes transmission of a plurality of informational tokens to be used for identifying the parties and confirming components of the transaction, wherein the plurality of parties comprise a Payer, a Receiver, and a Provider. The transaction comprises the delivery of a benefit by the Provider to the Receiver; and the payment of compensation from the Payer to the Provider. The informational tokens comprise a first informational token including identification of the Payer and the benefit, a second informational token providing identification of the Receiver, a third informational token providing identification of the Provider, and a fourth informational token providing identification of the benefit. The first, second, third and fourth informational tokens are transferred between the Payer, the Receiver and the Provider in conjunction with executing the transaction, wherein the informational token transfers comprise the transfer of the first informational token from the Receiver to the Provider in exchange for the benefit, and the transfer of the second, third and fourth informational tokens from the Provider to the Payer in exchange for the payment, wherein the Receiver receives the benefit from the Provider, and wherein the Provider receives the compensation from the Payer for providing the benefit to the Receiver.

Other embodiments include a computer readable medium having computer readable code thereon for coordinating and tracking the delivery of a benefit. The computer readable medium includes instructions for the transmission of a plurality of informational tokens to be used for identifying the parties and confirming components of the transaction, wherein the plurality of parties comprise a Payer, a Receiver, and a Provider. The transaction comprises the delivery of a benefit by the Provider to the Receiver; and payment of compensation from the Payer to the Provider. The informational tokens comprise a first informational token including identification of the Payer and the benefit, a second informational token providing identification of the Receiver, a third informational token providing identification of the Provider, and a fourth informational token providing identification of the benefit. The first, second, third and fourth informational tokens are transferred between the Payer, the Receiver and the Provider in conjunction with executing the transaction, wherein the informational token transfers comprise the transfer of the first informational token from the Receiver to the Provider in exchange for the benefit, and the transfer of the second, third and fourth informational tokens from the Provider to the Payer in exchange for the payment, wherein the Receiver receives the benefit from the Provider, and wherein the Provider receives the compensation from the Payer for providing the benefit to the Receiver.

Still other embodiments include computerized devices, configured to process all the method operations disclosed herein as embodiments of the invention. In such embodiments, the computerized devices include a memory system, a processor, communications interface in an interconnection mechanism connecting these components. The memory system is encoded with a process that provides coordinating and tracking the delivery of a benefit as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing coordinating and tracking the delivery of a benefit as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

Still other arrangements of embodiments of the invention that are disclosed herein include a server system connected to a network capable of performing the method embodiment steps and operations summarized above and disclosed in detail below. More generally, a server may be one of a number of computer devices that together in a distributed fashion perform the method embodiment steps, including servers, embedded systems, personal computers, and mobile devices such as handheld computers, smart phones, and other convergent mobile devices such as ipods and ipads.

It is to be understood that the embodiments of the invention can be embodied strictly as a software program, as software and hardware, or as hardware and/or circuitry alone, such as within a data communications device.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 comprises a high level flow diagram of the method for coordinating and tracking the delivery of a benefit.

DETAILED DESCRIPTION

Figure 1:
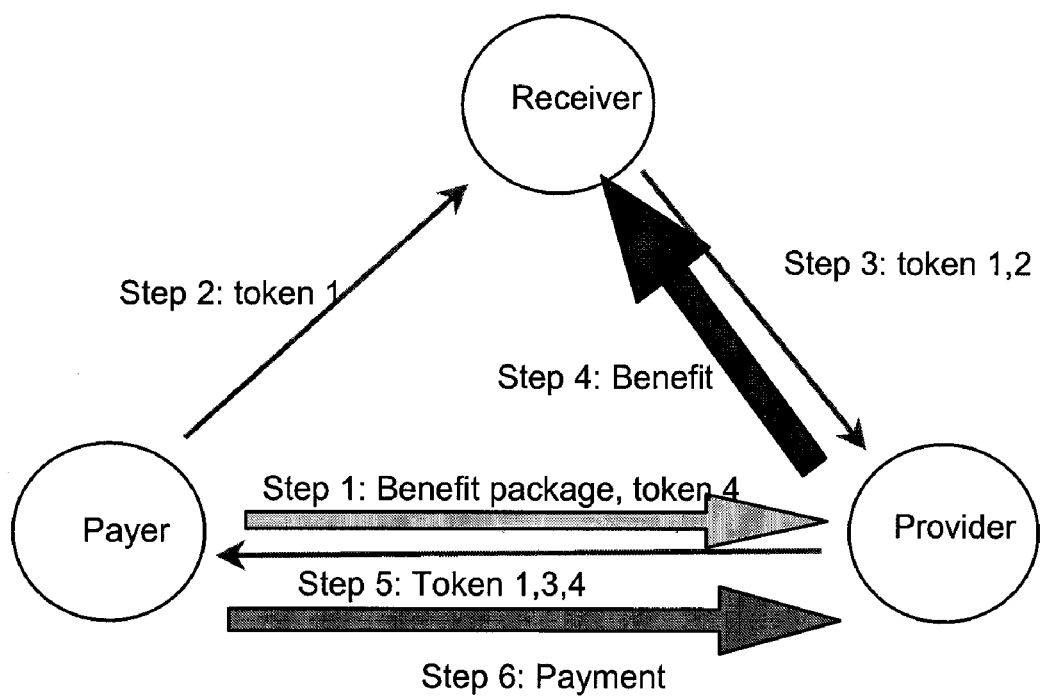
FIG. 1 comprises a diagram showing the flow of informational tokens between parties in accordance with a first particular embodiment of the invention.

Embodiments of the presently described method and apparatus for providing coordinating and tracking the delivery of a benefit relate to the monitoring of transactions through communication between parties that are directly and indirectly involved in the transaction. The communications enable mutual verification of the parties, authorizing and verifying the transaction. Achieving this through communications enables a significantly reduced cost compared to direct organizational oversight of a broad range of goods and services. The presently described method and apparatus for providing coordinating and tracking the delivery of a benefit relies upon the recognition that authorization and verification are essentially related to information and that informational channels are much easier to construct and use than transporting material or organizing people.

One example of a basic form of the method for providing coordinating and tracking the delivery of a benefit is described as follows. Alice wants Carol to receive a haircut. Carol agrees that he should receive a haircut but does not have the money to pay for the haircut. Alice is willing to pay, but is unable to accompany Carol and is concerned that Carol may use the money for another purpose if she gives the money for the haircut to Carol. Alice agrees that she will give Carol a token, and specifies the token as the number #42. Alice tells Carol that if Barber calls her with the correct number, she will authorize payment to Barber for a haircut. In this scenario, Barber must be told (or already aware of) Alice's correct phone number. Given specific assumptions about this scenario, the token could also have been Carol's name ("Carol said you could be charged"), or simply Alice's phone number ("I was told to call this number for payment authorization"). These are sufficient if it is assumed that, Alice does not generally pay for haircuts and therefore Alice is, respectively, otherwise unknown to individuals who want haircuts, otherwise unknown to barbers, and therefore unlikely to be called to pay for any other person if she does not want to pay for anybody's hair cut.

Given such a basic and uncomplicated case, these examples of informational tokens would be sufficient. However, in certain other environments there is a requirement for incorporating as options of the invention more specifically selected tokens relating to specific types of transaction.

In the following example: A is equivalent to Alice. In this case, a philanthropic or government organization that intends to fund a specific immunization within a population. B is equivalent to Barber, the provider of the immunization who is to receive payment from A from servicing the population. C is equivalent to Carol, an individual within the population that is to receive the immunization from B, with A promising payment for the immunization.

Organization A intends to fund immunizations among a population, but only for high-risk cases that pose a public health danger or those members of the population who cannot afford the immunization. Organization A may also be concerned about fraud or billing errors. In this case, each of the individuals to be immunized has an electronic form of identification, and organization A can send each individual a message containing a unique number. For example, for the case of individual C, who has the individual identification number (#P) P=7189273 and receives the number (#X) X=145123152. C can then go to immunization provider B and present these two unique numbers. Provider B transmits these numbers to organization A by any communication link (analog or digital, voice or typing, wired or wireless, phone, Internet, etc). Organization A compares the numbers against a list of assigned numerical pairs and the service/benefit (here, the immunization) to be provided. Organization A can then authorize the service and payment to provider B, assuring provider B of payment in exchange for the service of immunization.

If there is concern about provider B's reliability to deliver the service after authorization, organization A can provide an additional number (#Y) to individual C (either concurrent with transmission of the personal ID number P and X, or after organization A receives #X from provider B). Once individual C receives the inoculation, individual C gives #Y to provider B as the "surrogate currency" of the transaction. Provider B then transmits #Y and #P to funding source organization A, who compares lists of personal ID numbers (#P) and identifiers (#Y) to be given to the provider upon rendering the service.

These systems of verification provide security for organization A (to be certain that funds are being disbursed for desired services to the target individual), provider B (to assure payment for services rendered). Additional communications can provide other aspects of security and assurance for each of the parties. As with any security system, including direct oversight, the invention cannot be expected to prevent all forms of potential error, fraud or abuse.

There are cases where some of the communications may not be needed. One way that this may happen is that certain verification or validations are not needed due to trust. Trust can also enable some steps to be removed through encryption of one token in an-other. For example, if A can work directly with B, they can collaborate on creating a coding and decoding scheme that enables Alice to embed in an encrypted fashion by an agreed upon algorithm the personal ID number #P, and or the service to be provided, into the transmitted code #X in a way that is not otherwise known. In this case, the verification of the service to be provided to C can be done without the provider transmitting the numbers to A prior to providing the service. The transmission after providing the benefit is still necessary for verification that the transaction took place. If the encryption method became known, than it might be used by unintended recipients to deceive B into providing the benefit without being in the group intended by A to receive that benefit.

It is noted that such algorithmic encryption of information is currently used by software companies to control access to software. In their context, a key is provided to a user that has an encrypted version of a code embedded in the software. When entering the key, the encrypted code is decrypted and verified against the embedded code before enabling the software. As shown by the example above, encryption is not essential to the coordinating and tracking delivery of a benefit, however, it may be used to facilitate certain aspects thereof.

One mechanism of the invention is the transfer of informational tokens (messages that serve as identifiers). These informational tokens are transferred among the parties of the transaction, typically in loops, so that the closure of the loop provides verification of aspects of the transaction. Where loops are not needed, it is because prior communications replaced some steps in what would otherwise be loop processes.

The transaction process involves parties who exchange items of value between them. In order for such a transaction to proceed correctly each party must know what are the items that are to be exchanged and various other information as follows:

The payer may want to know whether a benefit was actually provided, who received the benefit (was it an intended recipient), who provided the benefit (to provide payment to the service provider, and to build a reputation for the provider), and what was the benefit that was provided. The recipient of the benefit may want to know what is the benefit they should receive, and who are possible providers of the benefit. The provider of the benefit may want to know whether a particular individual is an intended recipient, what is the service to be provided to them, who is the payer for the service, what is the amount of payment for the service, what they should receive at the time of the transaction from the benefits recipient, and whether they are authorized to give the service, among others.

The method and apparatus used for coordinating and tracking a transaction involving a plurality of parties involves the transmission of a plurality of informational tokens to be used for identifying the parties and confirming components of the transaction. The plurality of parties comprises a Payer, a Receiver, and a Provider. The Receiver receives the benefit from the Provider, and the Provider receives the compensation from the Payer for providing the benefit to the Receiver.

The transaction comprises the delivery of a benefit by the Provider to the Receiver, and payment of compensation from the Payer to the Provider. The benefit comprises a product, a service, or a service having consumable materials associated therewith and/or informational materials associated therewith. The transaction involves use of the informational tokens to provide mutual verification of the Payer, the Receiver and the Provider. The transaction may further involve use of the informational tokens to provide authorization and verification of the transaction.

For example, the informational tokens may comprise a first informational token including identification of the Payer and the benefit, a second informational token providing identification of the Receiver, a third informational token providing identification of the Provider, and a fourth informational token providing identification of the benefit. The first, second, third and fourth informational tokens are transferred between the Payer, the Receiver and the Provider in conjunction with executing the transaction. Certain embodiments may include at least one additional informational token, wherein the at least one additional informational token is utilized by at least one of the Payer, the Receiver and the Provider while executing the transaction. In certain embodiments at least one of the informational tokens may be encrypted during at least a portion of the transaction. In another embodiment, at least one of the informational tokens is transferred in a loop, wherein the closure of the loop provides verification of aspects of the transaction.

The informational token transfers comprise the transfer of the first informational token from the Receiver to the Provider in exchange for the benefit, and the transfer of the second, third and fourth informational tokens from the Provider to the Payer in exchange for the payment.

In another particular embodiment, the Payer has a first personal electronic device, the Receiver has a second personal electronic device, and the Provider has a third personal electronic device. The first personal electronic device comprises a first cellular telephone, the second personal electronic device comprises a second cellular telephone and the third personal electronic device comprises a third cellular telephone. The identity of the Payer is associated with the first personal electronic device, the identity of the Receiver is associated with the second personal electronic device, and the identity of the Provider is associated with the third personal electronic device. In particular, the identity of the Payer is a telephone number of the first cellular telephone, the identity of the Receiver is a telephone number of the second cellular telephone, and the identity of the Provider is a telephone number of the third cellular telephone.

Referring now to FIGS. 1 and 2, which illustrate particular examples of the use of informational tokens during transactions, incorporating four and six informational tokens respectively. These specific examples are not exhaustive.

A first informational token is transferred from the payer to the receiver of the benefit, this token then serves as a surrogate currency for the transaction between the receiver and the provider. The token may be uniquely associated with the benefit. It may also uniquely identify the payor. This token is then transferred at the time of transaction to the provider, and thence to the payer. The payer recognizes the token as verification of the transaction.

A second informational token is associated with the intended receiver of the benefit, for example the cell phone number or government issued id of the intended receiver. This informational token may be previously known to the payer, may be verified to the payer at the time of the transfer of the first token from payer to intended receiver, and this token is also transferred from the intended receiver to the provider and thence to the payer. This provides verification of the individual to whom the benefit is provided.

A third informational token is associated with the provider. This token may be sent to the payer at the time of the transaction to identify to whom payment should be made.

A fourth informational token is associated with the benefit, and may be transferred to the provider of the benefit along with a benefit associated package. At the time of the transaction, the fourth informational token is transferred to the payer to identify the benefit delivered. The fourth informational token may also be transferred to the recipient and thence to the payer to verify receipt of the benefit by the receiver. If the benefit is a package there is generally such a benefit-associated package. If the benefit is primarily a service but has consumable materials associated with the service, it may still be associated to the service-associated package. The benefit-associated package may have information about the service to be provided including what is the benefit to be provided and payment amount for that benefit. This provides some of the necessary information to the provider and receiver of the benefit. If a service does not include a service-associated package, the fourth token may be transferred through a communication channel to the service provider. In this case the intended recipient of the benefit must receive the benefit-associated information from another source. To avoid certain transaction frauds, each of them must receive information independently from the payer. In particular, to avoid the case of a recipient receiving services that are greater (less than) the intended services, the provider (recipient) should receive this information independently of the recipient (provider), for example, by receiving this information directly from the payer.

A fifth informational token identifies the payer as well as the recipient and the benefit, and may be transferred from the payer to the receiver of the benefit. This token then serves as a pre-transaction verifier of the intention of the payer to pay for the benefit for that recipient. The token may be transmitted by the provider to the payer immediately prior to the transaction to receive confirmation from the payer of the intention of the payer to pay for the transaction.

A sixth informational token identifies the payer as well as the provider and the benefit, and may be transferred from the payer to the provider of the benefit. This token then serves as a transaction verifier by transfer from the provider to the recipient. The token may be sent from the recipient to the payer to identify the provider of the service to be received and confirm the transaction.

Using these six informational tokens, the transaction process can be validated to the payer. The verification process, in contrast to the delivery of the good or service, is an informational one. Thus, the invention relies upon a sequence of communications that involve all three parties in order to validate the transfer of the benefit. These communications identify and confirm the transaction as well as all of the parties involved in the transaction, to the extent that the communication medium allows, and to the extent that is desired by the participants in the transaction. The ability to validate arises because of the uniqueness of tokens or combinations of tokens and other identifiers associated with parties to the transaction.

In one preferred embodiment, communications between individuals with cellular (cell) phones are used. Each cell phone has a cell phone number, which automatically serves as an identifier associated to the individual to whom the cell phone is registered. The method as described does not validate the relationship between the cell phone and its registered individual. (Methods for such associative validation will be described separately.) Telephonic communication is not essential to the invention, Internet, wireless or wired communication or other forms of communication between individuals or their personal electronic devices can serve as well.

An instance of a particular embodiment of the coordinating and tracking delivery of a benefit is described in which three parties are involved and named as &Alice, &Carol and &Bob. &Alice is the provider of funds and identifier of service or provider of product, having cell number #Alice and may be one of many possible providers of funds. &Bob is the recipient of the benefit as intended by &Alice having a cell phone with cell number #Bob, and may be one of many intended recipients of the benefit. &Carol is the provider of delivery of the benefit, having a cell phone with cell number #Carol, and may be one of many possible providers of the benefit.

A sequence of communications that allows a level of verification of the delivery of a service or product by &Carol to &Bob by &Alice includes the following steps.

Step 1: &Alice calls &Bob's cell phone number #Bob and leaves a message with a distinctive number identifier #X with a particular degree of distinguishing uniqueness (so that multiple instances of potential recipients or may receive distinct numbers #X1, #X2, . . . ). The uniqueness of the identifier of the receiver inhibits unintended recipients from receiving the benefit, and false claims of benefit delivery.

Step 2: &Alice gives a benefit *M related package to &Carol along with distinctive identifier number #Y with a particular degree of distinguishing uniqueness (so that multiple instances of product *M to be accompanied (labeled) perhaps by distinct numbers #Y1,#Y2, . . . ), the uniqueness of the identifier #Y inhibits false and multiple claims of delivery of the same benefit, or benefit associated package.

Step 3: &Carol gives benefit *M to &Bob along with number #Y and receives a call from &Bob leaving record of number #Bob and with message of number #X, Step 4: &Carol gives call to &Bob from number #Carol with message of number #Y.

Step 5: &Carol calls &Alice with message containing numbers #X, #Y, and #Bob and leaving record of number #Carol.

Step 6: &Bob calls &Alice with message containing numbers #X, #Y, and #Carol and leaving record of number #Bob. Following this process of validation and verification, &Alice can provide payment to &Carol for providing product or service *M.

Additional variants can involve multiple delivery providers that transfer the product or service related package until delivery is performed, additional communications that provide prior approval for the transaction and involve additional identifiers, fewer communications if needed validation or verification can be relaxed, and additional identifiers to specify the payer and designate a particular provider of the service. Calls may be replaced by communication between mobile devices using WiFi, bluetooth, other wireless or wired communications, or optical recognition by one device of another devices' display.

In one particular embodiment the service is the delivery of HIV medications to individuals in Africa who have cell phones. The limited organizational infrastructure in Africa makes the ability to verify the delivery of the medications difficult and expensive. In another embodiment, the service is a preventive health-care service that is paid for by a government of a developed country. Through the invention, an electronic equivalent of vouchers for the service are to provided to these individuals. In still another embodiment, the product or service is a trial sample paid for by a corporation to promote their products or services. In yet another embodiment, the benefit is a prize or award provided by an organization.

Validation of the individual to be provided a service or product can be augmented by having the benefit to be provided be a biomarker test that uniquely identifies the individual who has the associated cell phone.

It is noted that embodiments of the coordinating and tracking delivery of a benefit accommodate the flexibility of providing many service related packages to distinct delivery providers without need for payment for service delivery as long as codes are sufficiently unique, since payment does not occur unless delivery is verified.

It is additionally noted that the coordinating and tracking delivery of a benefit does not ensure that products are not diverted to unintended recipients given that they are given to the provider in advance of the delivery. However, if product delivery is repeated over time, the validation enables choosing the delivery providers that reliably deliver.

It is further noted that the invention can be adapted to forming various kinds of currency that are to be used for specific purposes, which may be called "labeled currencies," or "product specific currencies" ranging in use from commercial products by discount coupons, gift certificates, awards, and so on.

Loops are often necessary in communications for verification or validation, because an informational verification or validation processes involves comparison of two tokens that are found to be the same (or logically equivalent according to a pre-specified logical transformation). The first token being that sent and the second being that received after transfer in a loop through the process of the transaction. Alternatively, the first token being received by the verifier from one party and the second being received by the verifier from a second party.

In this case the two tokens must have originated at some point by one party through duplication prior to some set of non-equivalent communication transfers and therefore are the same though having passed through different communication routes to their common destination.

Loops also occur implicitly when two distinct identifiers are associated by their degree of uniqueness. For example, if a sufficiently unique identifier of a benefit is transmitted from the payer to the receiver #X, and a different sufficiently unique identifier of the benefit is transmitted from the payer to the provider #Y prior to the transaction. During the transaction, if an identifier of the recipient known to the payer #B is transmitted from the recipient to the provider, and is subsequently transmitted by the provider along with the benefit identifier he had already received (#B,#Y) this may be sufficient for the payer to verify the transaction as the payer already has the association of the unique identifier #B with #X in the payers records. This process, however, does not address the possibility that a publicly known identifier of the recipient #B might be used by a fourth party to fraudulently obtain the service. Alternatively, the provider may transmit the two benefit identifiers (#X,#Y), as #X also serves as an identifier of the recipient through its uniqueness.

Referring now to FIG. 1, a block diagram showing the transfer of informational tokens between three parties is depicted. The three parties comprise a Payer A, a Receiver B and a Provider C. Four informational tokens are used, designated by numbers 1-4 respectively. The first informational token includes an identification of the Payer and the benefit. The second informational token provides an identity of the Receiver. The third informational token provides an identity of the Provider. The fourth informational token provides an identity of a benefit, the benefit which is the subject of the transaction.

Step 1: The payer provides token 4 to a distributor of the benefit package.

Step 2: The transaction is executed starting with the Payer transmitting the first informational token to the Receiver. The Receiver is now aware of the identification of the Payer and the benefit.

Steps 3-4: Upon the Receiver receiving the first informational token from the Payer and in response thereto, the Receiver goes to the provider and in exchange for the benefit transmits the first informational token and the second informational token to the provider.

Steps 5-6: The Provider then transmits the first informational token, the second informational token and the third informational token to the Payer, thereby making the Payer aware that the Provider has received the informational tokens from the Receiver and provided the benefit. The Provider is now able to receive compensation from the Payer for providing the benefit to the Receiver.

Figure 2A:
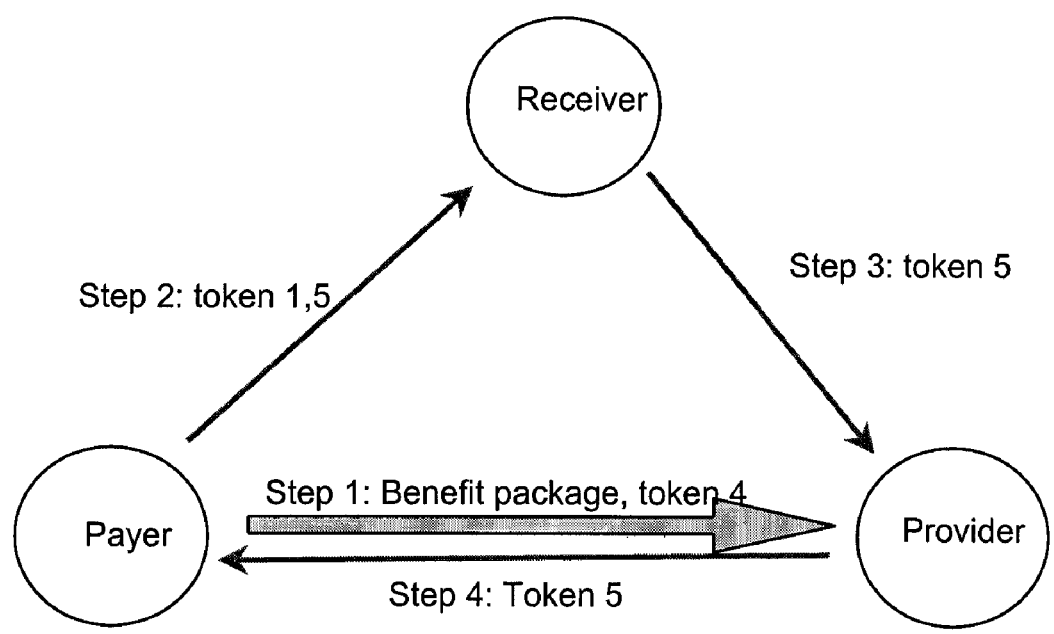
FIGS. 2A and 2B comprises a diagram showing the flow of informational tokens between parties in accordance with a second particular embodiment of the invention.
Figure 2B:
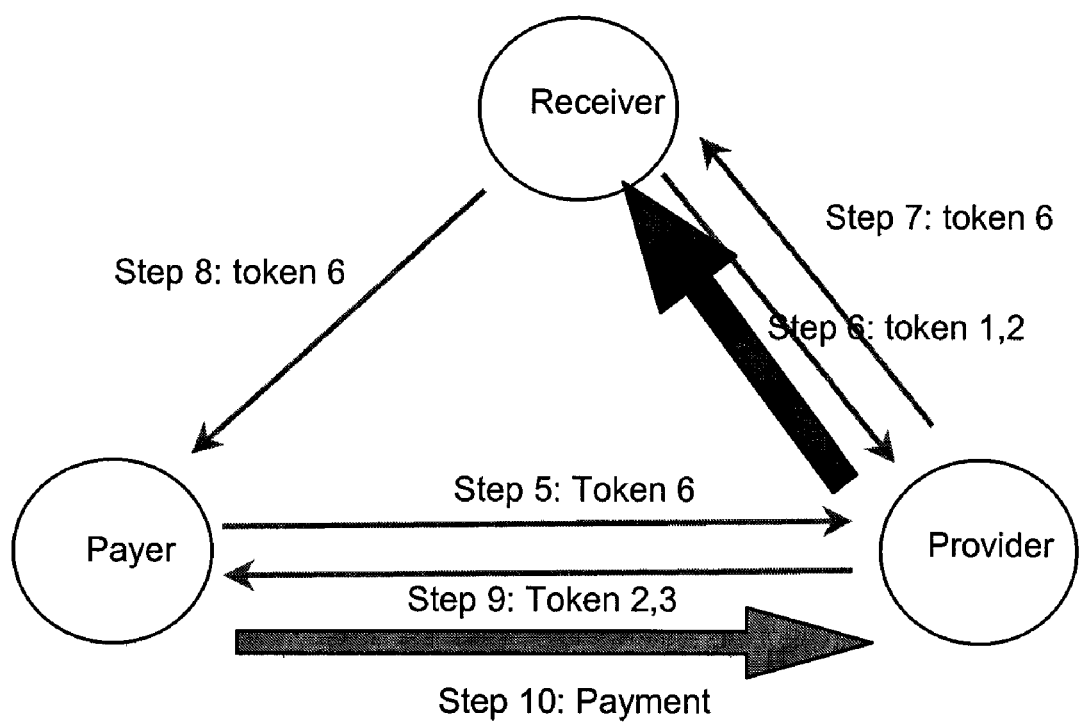

Referring now to FIGS. 2A and 2B, a block diagram showing a second embodiment for the transfer of informational tokens between three parties is depicted. The same three parties (Payer, Receiver and Provider) are used as are the same four tokens as were described with respect to FIG. 1, however two additional tokens (a fifth informational token and a sixth informational token) are also used. The fifth informational token provides an identity of the Payer and the Receiver. The sixth informational token provides an identity of the Payer and the Provider.

Step 1: The payer provides token 4 to a distributor of the benefit package.

Step 2: The transaction is executed starting with the Payer transmitting the first informational token and the fifth informational token to the Receiver. The Receiver is now aware of the identification of the Payer, the Receiver and the benefit.

Step 3: Upon the Receiver receiving the first informational token and the fifth informational token from the Payer and in response thereto, the Receiver goes to the provider and transmits the fifth informational token to the Provider.

Step 4: Prior to executing said transaction, the Provider transmits the fifth informational token to the Payer, the fifth informational token is used to confirm an intention of the Payer to pay for the transaction.

Step 5: The Payer then transmits the sixth informational token to the Provider.

Step 6-7: In exchange for the benefit, the receiver transmits the first informational token and the second informational token to the provider. The provider transmits the sixth informational token to the receiver.

Step 8: The Receiver transmits the sixth informational token to the Payer, confirming that the receiver has received the service.

Step 9: The Provider then transmits the second informational token and the third informational token to the Payer, thereby making the Payer aware that the Provider has provided the service.

Step 10: The Provider is now able to receive compensation from the Payer for providing the benefit to the Receiver.

A high level flow diagram of the method for coordinating and tracking delivery of a benefit is shown in FIG. 3. The method includes 3 major parts, a first part that takes place prior to the transaction, a second part that involves the transaction and a third part regarding payment.

Part 1 of the methodology includes two steps. The first step involves the Payer arranging for or confirming that the benefit can be delivered by Provider to a Recipient and induces transmission of benefit associated informational token 4 to the Provider. The second step involves the Payer transmitting a message with informational token 1 to Receiver, identifying the Payer and the benefit Payer is willing to pay for the Receiver. Uniqueness of the informational token may serve to identify the recipient for the transaction even without an identifier of the Receiver.

Part 2 of the methodology also includes two steps. The third step entails the Receiver going to a Provider and transmitting informational tokens 1 and 2 to the Provider. The fourth step comprises the Provider giving the benefit to the Receiver.

Part 3 of the methodology again includes two steps. The fifth step comprises the Provider transmitting informational tokens 1,3,4 to the Payer. The sixth and final step has the Payer paying the Provider.

Figure 4A:
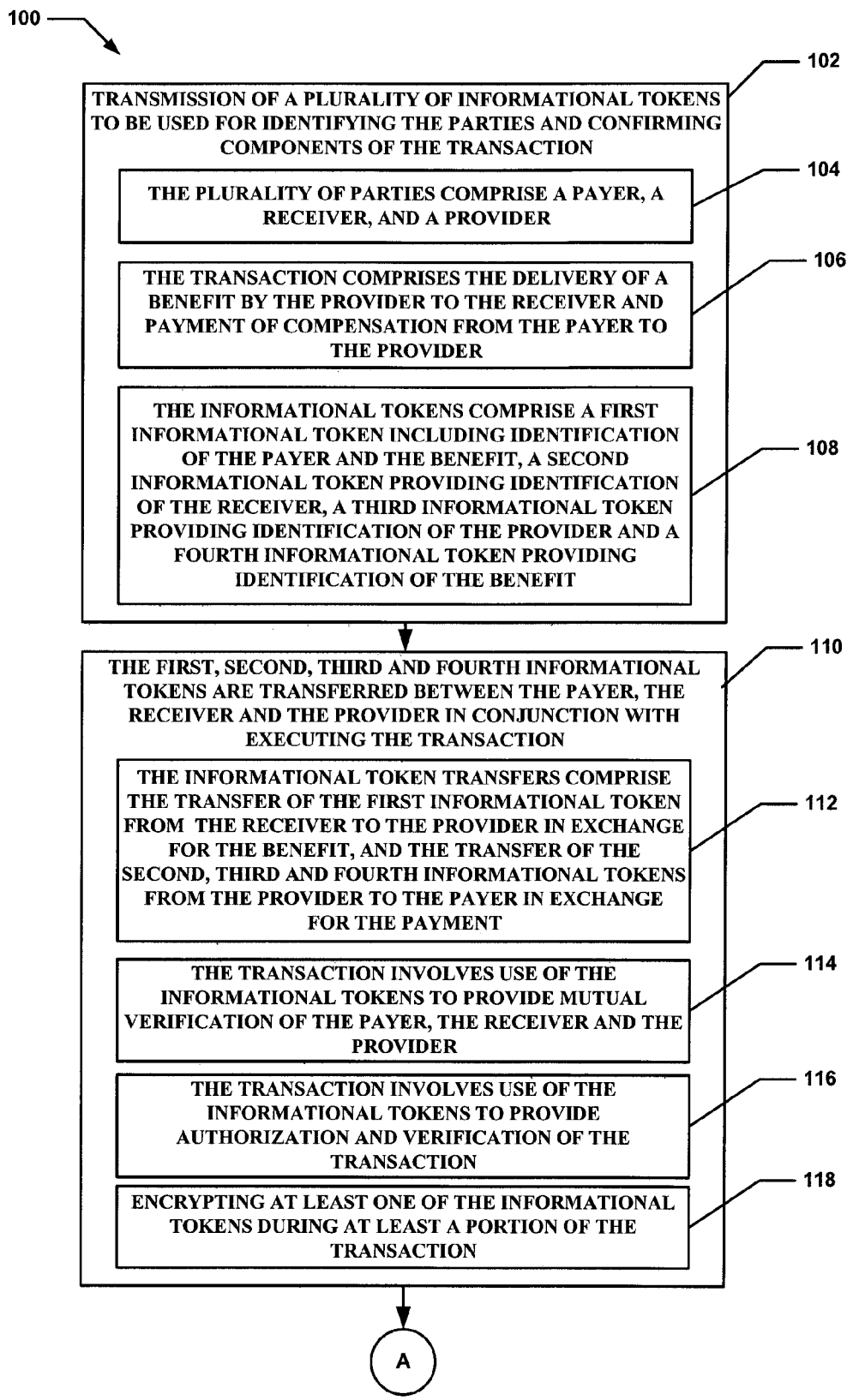
FIGS. 4A-4C comprises a flow diagram of a method for coordinating and tracking the delivery of a benefit in accordance with a particular embodiment of the invention.
Figure 4B:
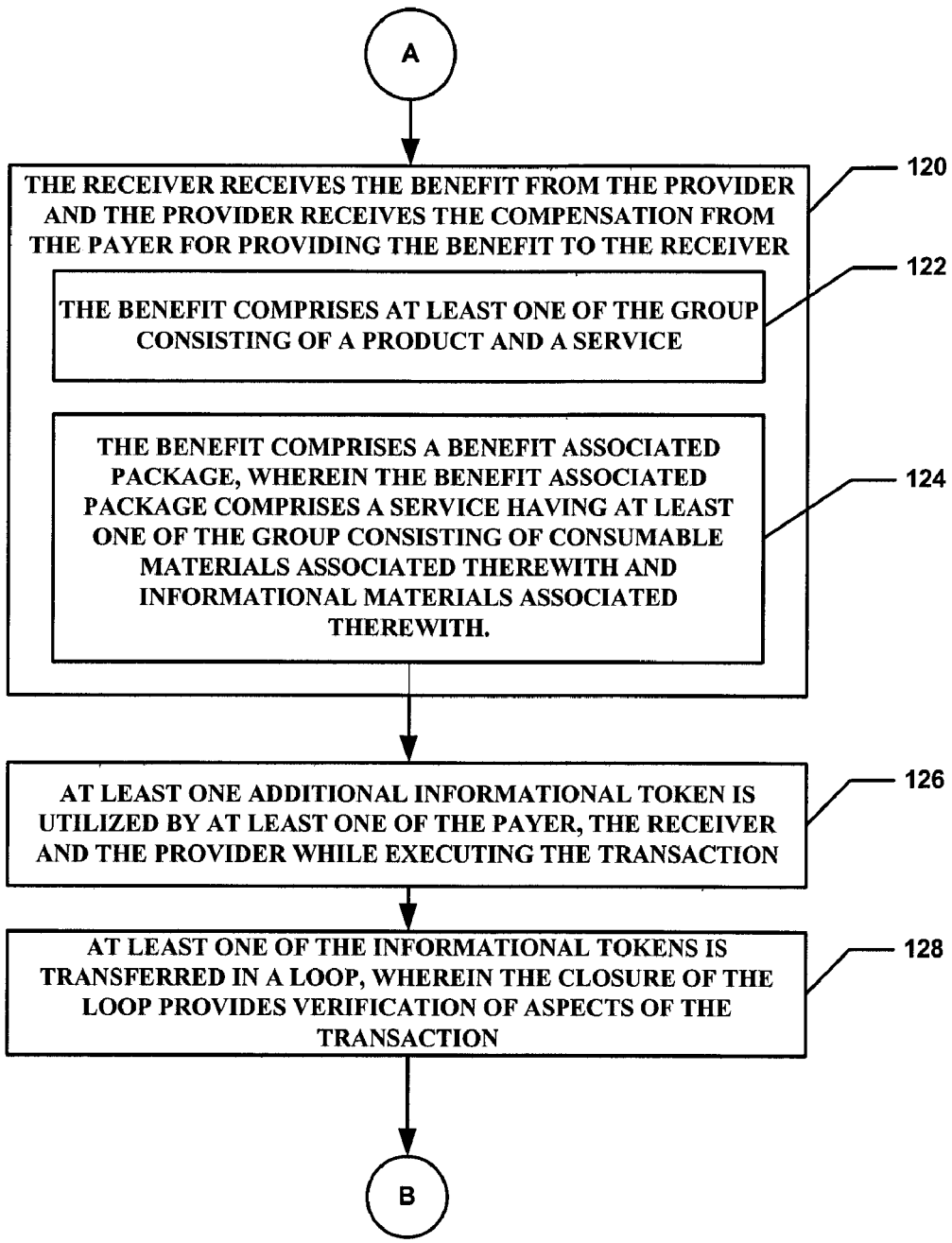
Figure 4C:
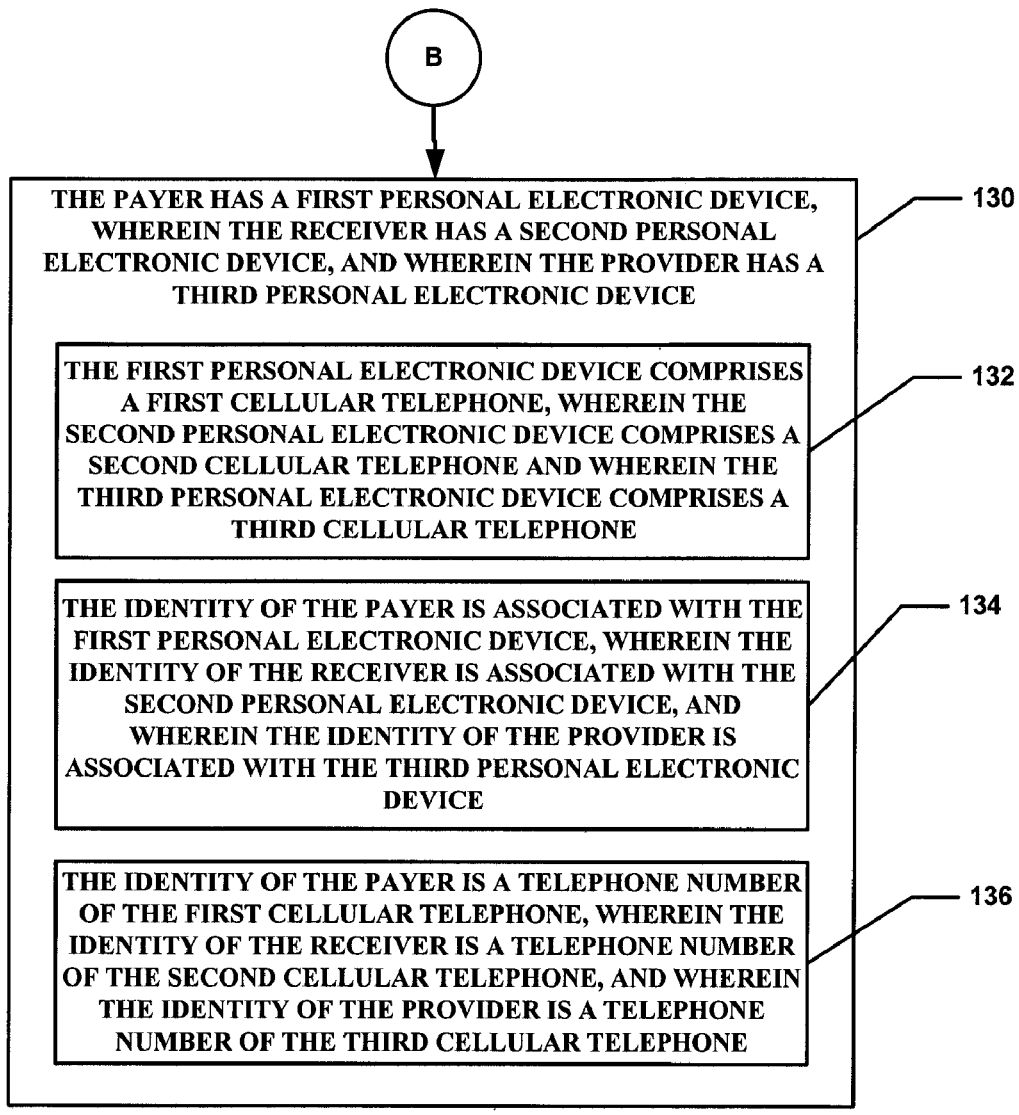

Flow diagrams of particular embodiments of the presently disclosed methods are depicted in FIGS. 4A-4C. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A-4C, a method 100 of coordinating and tracking the delivery of a benefit is shown. Method 100 begins with processing block 102 which discloses transmission of a plurality of informational tokens to be used for identifying the parties and confirming components of the transaction. As shown in processing block 104 the plurality of parties comprise a Payer, a Receiver, and a Provider. Processing block 106 shows that the transaction comprises the delivery of a benefit by the Provider to the Receiver, and payment of compensation from the Payer to the Provider. As shown in processing block 108 the informational tokens comprise a first informational token including identification of the Payer and the benefit, a second informational token providing identification of the Receiver, a third informational token providing identification of the Provider, and a fourth informational token providing identification of the benefit.

Processing block 110 states the first, second, third and fourth informational tokens are transferred between the Payer, the Receiver and the Provider in conjunction with executing the transaction. Processing block 112 recites the informational token transfers comprise the transfer of the first informational token from the Receiver to the Provider in exchange for the benefit and the transfer of the second, third and fourth informational tokens from the Provider to the Payer in exchange for the payment. As shown in processing block 114, the transaction involves use of the informational tokens to provide mutual verification of the Payer, the Receiver and the Provider. Processing block 116 recites the transaction involves use of the informational tokens to provide authorization and verification of the transaction. Processing block 118 discloses encrypting at least one of the informational tokens during at least a portion of the transaction.

Processing continues with processing block 120 which discloses the Receiver receives the benefit from the Provider and the Provider receives the compensation from the Payer for providing the benefit to the Receiver. As shown in processing block 122 the benefit comprises at least one of the group consisting of a product and a service. As further shown in processing block 124 the benefit comprises a benefit associated package, wherein the benefit associated package comprises a service having at least one of the group consisting of consumable materials associated therewith and informational materials associated therewith.

Processing block 126 states at least one additional informational token is utilized by at least one of the Payer, the Receiver and the Provider while executing the transaction. Processing block 128 recites at least one of the informational tokens is transferred in a loop, wherein the closure of the loop provides verification of aspects of the transaction.

Processing block 130 discloses the Payer has a first personal electronic device, wherein the Receiver has a second personal electronic device, and wherein the Provider has a third personal electronic device. As shown in processing block 132 the first personal electronic device comprises a first cellular telephone, the second personal electronic device comprises a second cellular telephone and the third personal electronic device comprises a third cellular telephone. Processing block 134 states the Payer is associated with the first personal electronic device, wherein the identity of the Receiver is associated with the second personal electronic device, and wherein the identity of the Provider is associated with the third personal electronic device. Processing block 136 recites the identity of the Payer is a telephone number of the first cellular telephone, the identity of the Receiver is a telephone number of the second cellular telephone, and the identity of the Provider is a telephone number of the third cellular telephone.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium.

For example, such a computer usable medium can include a readable memory device, such as a hard drive device, a CD-ROM, or a DVD-ROM, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method in which at least one computer system accesses instructions from computer storage and executes the instructions to coordinate and track at least a portion of a transaction process involving a plurality of parties that engage in at least a portion of a transaction, wherein the plurality of parties includes at least: (1) a Receiver with at least one associated device having a second informational token, (2) a Provider with at least one associated device having a third informational token (3) a Payer with at least one associated device having a first informational token;

wherein the first informational token provides identification of said Payer and at least one of a service and a product, the second informational token provides identification of said Receiver, the third informational token provides identification of said Provider;

wherein at least a portion of said transaction process comprises:

transmission of the first informational token from said at least one associated device of the Payer to said at least one associated device of the Receiver;

after receipt of the first informational token by said at least one associated device of the Receiver, transmission of the first and second informational tokens from said at least one associated device of the Receiver to said at least one associated device of the Provider;

initiating delivery of at least a portion of at least one of said service and said product from said Provider to said Receiver in exchange for receipt of the first and second informational tokens by said at least one associated device of the Provider;

after receipt of the first and second informational tokens by said at least one associated device of the Provider, transmission of the second and third informational tokens from said at least one associated device of the Provider to said at least one associated device of the Payer device;

verifying receipt of at least one of said service and said product by the Receiver from said Provider based on receipt of the second and third informational tokens by said at least one associated device of the Payer; and transmission of compensation from said Payer to said Provider upon verifying receipt of at least one of said service and said product by the Receiver.

2. The method of claim 1 wherein said benefit comprises at least one of the group consisting of a product and a service.

3. The method of claim 1 wherein said benefit comprises a benefit associated package, wherein said benefit associated package comprises a service having at least one of the group consisting of consumable materials associated therewith and informational materials associated therewith.

4. The method of claim 1 further comprising at least one additional informational token and wherein said at least one additional informational token is utilized by at least one of said at least one associated device of the Payer, said at least one associated device of the Receiver and said at least one associated device of the Provider while executing said transaction.

5. The method of claim 1 wherein said transaction process involves use of said informational tokens to provide mutual verification of said Payer, said Receiver and said Provider.

6. The method of claim 1 wherein said transaction process involves use of said informational tokens to provide authorization and verification of said transaction.

7. The method of claim 1 further comprising encrypting at least one of said informational tokens during at least a portion of said transaction.

8. The method of claim 1 wherein at least one of said informational tokens is transferred in a loop, wherein the closure of the loop provides verification of aspects of the transaction.

9. The method of claim 1 wherein said Payer has a first personal electronic device, wherein said Receiver has a second personal electronic device, and wherein said Provider has a third personal electronic device.

10. The method of claim 9 wherein said first personal electronic device comprises a first cellular telephone, wherein said second personal electronic device comprises a second cellular telephone and wherein said third personal electronic device comprises a third cellular telephone.

11. The method of claim 9 wherein said identity of said Payer is associated with said first personal electronic device, wherein said identity of said Receiver is associated with said second personal electronic device, and wherein said identity of said Provider is associated with said third personal electronic device.

12. The method of claim 11 wherein said identity of said Payer is a telephone number of said first cellular telephone, wherein said identity of said Receiver is a telephone number of said second cellular telephone, and wherein said identity of said Provider is a telephone number of said third cellular telephone.

13. A non-transitory computer readable storage medium having computer readable code thereon that, when executed by at least one processor, causes the processor to perform a method for coordinating and tracking at least a portion of a transaction process involving a plurality of parties that engage in at least a portion of a transaction, wherein the plurality of parties includes at least: (1) a Receiver with at least one associated device having a second informational token, (2) a Provider with at least one associated device having a third informational token and a fourth informational token (3) a Payer with at least one associated device having a first informational token;

wherein the first informational token provides identification of said Payer and at least one of a service and a product, the second informational token provides identification of said Receiver, the third informational token provides identification of said Provider, the fourth informational token provides identification of at least one of said service and said product;

the transaction comprising:
transmission of the first informational token from said at least one associated device of the Payer to said at least one associated device of the Receiver;

after receipt of the first informational token by said at least one associated device of the Receiver, transmission of the first and second informational tokens from said at least one associated device of the Receiver to said at least one associated device of the Provider;

initiating delivery of at least a portion of at least one of said service and said product from said Provider to said Receiver in exchange for receipt of the first and second informational tokens by said at least one associated device of the Provider;

after receipt of the first and second informational tokens by said at least one associated device of the Provider, transmission of the second, third and fourth informational tokens from said at least one associated device of the Provider to said at least one associated device of the Payer;

verifying receipt of at least one of said service and said product by the Receiver from said Provider based on receipt of the second, third and fourth informational tokens by said at least one associated device of the Payer; and transmission of compensation from said Payer to said Provider upon verifying receipt of at least one of said service and said product by the Receiver.

14. The computer readable storage medium of claim 13 further comprising instructions wherein said benefit comprises at least one of the group consisting of a product and a service.

15. The computer readable storage medium of claim 13 further comprising instructions wherein said benefit comprises a benefit associated package, wherein said benefit associated package comprises a service having at least one of the group consisting of consumable materials associated therewith and informational materials associated therewith.

16. The computer readable storage medium of claim 13 further comprising instructions for at least one additional informational token and wherein said at least one additional informational token is utilized by at least one of said at least one associated device of the Payer, said at least one associated device of the Receiver and said at least one associated device of the Provider while executing said transaction.

17. The computer readable storage medium of claim 13 further comprising instructions wherein said transaction involves use of said informational tokens to provide mutual verification of said Payer, said Receiver and said Provider.

18. The computer readable storage medium of claim 13 further comprising instructions wherein said transaction involves use of said informational tokens to provide authorization and verification of said transaction.

19. The computer readable storage medium of claim 13 further comprising instructions for encrypting at least one of said informational tokens during at least a portion of said transaction.

20. The computer readable storage medium of claim 13 further comprising instructions wherein at least one of said informational tokens is transferred in a loop, wherein the closure of the loop provides verification of aspects of the transaction.

21. The computer readable storage medium of claim 13 further comprising instructions wherein said Payer has a first personal electronic device, wherein said Receiver has a second personal electronic device, and wherein said Provider has a third personal electronic device.

22. The computer readable storage medium of claim 21 further comprising instructions wherein said first personal electronic device comprises a first cellular telephone, wherein said second personal electronic device comprises a second cellular telephone and wherein said third personal electronic device comprises a third cellular telephone.

23. The computer readable storage medium of claim 21 further comprising instructions wherein said identity of said Payer is associated with said first personal electronic device, wherein said identity of said Receiver is associated with said second personal electronic device, and wherein said identity of said Provider is associated with said third personal electronic device.

24. The computer readable storage medium of claim 23 further comprising instructions wherein said identity of said Payer is a telephone number of said first cellular telephone, wherein said identity of said Receiver is a telephone number of said second cellular telephone, and wherein said identity of said Provider is a telephone number of said third cellular telephone.

25. The method as in claim 1, wherein at least a portion of said transaction process comprises at least one of:
   (i) generating data to indicate an association between said first informational token and said Payer;
   (ii) generating data to indicate an association between said second informational token and said Receiver; and
   (iii) generating data to indicate an association between said third informational token and said Provider.

26. The method as in claim 1, comprising:
   wherein said Payer also has a fourth informational token, the fourth informational token transmitted to the Provider from the Payer prior to transmission of the first and second informational tokens from the Receiver to the Provider; and
   transmission of the fourth informational token occurs with the transmission of the second and the third informational tokens from said Provider to said Payer after the receipt of the first and second informational tokens by said Provider.

27. The computer readable storage medium of claim 13, wherein at least a portion of said transaction process comprises at least one of:
   (i) generating data to indicate an association between said first informational token and said Payer;
   (ii) generating data to indicate an association between said second informational token and said Receiver; and Receiver.
   (iii) generating data to indicate an association between said third informational token and said Provider. Provider; and
   (iv) generating data to indicate an association between said fourth informational token and said service or product.

* * * * *